United States Patent Office 3,326,890
Patented June 20, 1967

3,326,890
HYDROXYALKYL ETHERS OF GALACTOMANNANS AND PROCESS FOR THEIR PREPARATION
Konrad Engelskirchen, Lank (Lower Rhine), and Joachim Galinke, Dusseldorf-Holthausen, Germany, assignors to Henkel & Cie. G.m.b.H., Dusseldorf-Holthausen, Germany, a corporation of Germany
No Drawing. Filed Dec. 18, 1964, Ser. No. 419,599
Claims priority, application Germany, Jan. 29, 1964, H 51,525
7 Claims. (Cl. 260—209)

The invention relates to a process for the preparation of hydroxyalkyl ethers of naturally occurring galactomannans such as guar flour and locust bean flour (carubin) and to products obtained by the said process.

Hydroxyalkyl ethers of these galactomannans, in particular the hydroxyethyl- and hydroxypropyl ethers are already known. For their preparation the glactomannans as mentioned have been, until now, dissolved or dispersed in an excess of dilute aqueous sodium hydroxide and reacted with ethyleneoxide or propyleneoxide. The reaction mixture was held at rest for a prolonged period at room temperature until the entire amount of alkylene oxide was reacted. Subsequently, the mixture was neutralized and the highly viscous solutions thus obtained were evaporated to dryness. The cake resulting therefrom was ground. It was also known to prepare the hydroxyethyl ether of guar flour by reacting the disodium compound of guar with ethylene chlorohydrin.

In both types of process the hydroxyalkyl ethers formed show marked impurity, in particular, due to sodium salts. The removal of these impurities presents considerable difficulties due to the good water-solubility of the hydroxyalkyl ethers of galactomannan.

An object of the present invention is the development of a process for the production of a hydroxy-lower-alkyl ether of galactomannan which comprises the steps of reacting a suspension of a galactomannan in a water-miscible organic solvent containing from about 10% to about 50% of water, said organic solvent being substantially inert under the reaction conditions, with a lower alkylene oxide in the presence of a catalytic amount an alkaline agent selected from the group consisting of organic amines and quaternary organic ammonium hydroxides, at temperatures from about room temperature to about 100° C. separating the resultant hydroxy-lower-alkyl ether of galactomannan from the reaction mixture and recovering said hydroxy-lower-alkyl ether of galactomannan.

Another object of the present invention is the obtention of a substantially pure hydroxy-lower-alkyl ether of galactomannan by the process of the invention.

These and other objects of the present invention will become more apparent as the description thereof proceeds.

Now a process has been discovered to prepare hydroxy-lower-alkyl ethers of galactomannans by reacting the galactomannans with lower alkylene oxides in the presence of alkaline agents, which process does not present the disadvantages as described above. This new process is characterized in that galactomannans such as guar flour and/or locust bean flour (carubin) are suspended in an organic, water-miscible solvent containing about 10–50%, preferably 20–30%, of water, which organic solvent is substantially inert and practically non-reacting under the reaction conditions with the alkylene oxides and further characterized in that these galactomannans are reacted in the presence of a catalytic amount of an alkaline agent selected from the group consisting of organic amines and quaternary organic ammonium hydroxides, with lower alkylene oxides, and finally the resulting hydroxy-lower-alkyl ethers of the galactomannans are isolated from the reaction mixture by filtering or centrifuging.

As starting material for the process of the invention, the galactomannans of natural origin, as for example, guar flour or locust bean flour are especially suitable, these galactomannans being obtained by grinding the endosperm of the seeds of the guar bean tree or of the locust bean tree. The raw products as well as refined flours may be used.

For the suspension of the galactomannans, organic, water-miscible solvents are preferred which, under the chosen reaction conditions do not react at all or to a very slight degree only with the lower alkylene oxides. Quite suitable are secondary lower alkanols such as isopropanol, secondary butanol, secondary amyl alcohols, also tertiary lower alkanols such as tertiary butanol and amyl alcohol, furthermore, lower alkanones such as acetone, methylethylketone and diethylketone; also suitable are other water-miscible organic solvents such as dioxane, dimethyl formamide and many others. It is also possible to use admixtures of the solvents as mentioned in the preceding. In view of the subsequent purification preferably those solvents are used which possess a relatively low boiling point, and, therefore, can be easily evaporated.

The utlization of primary alcohols as for instance methanol, ethanol and n-propanol for the dispersion or suspension of the galactomannans is also possible in itself. However, as the primary hydroxy groups react essentially faster than the secondary and tertiary alcohols previously mentioned, the yields, based on the lower alkylene oxide, decrease considerably in such case.

The water content of the organic solvent used for the dispersion should amount to about 10–50%, preferably 20–30%, based on the solvent or solvent mixture. It is determined primarily according to the characteristics of the solvent and it is of importance for the quality of the resulting hydroxy lower alkyl ethers of the galactomannans. In the case where too little water is used or where the reaction is conducted in an anhydrous medium, no galactomannan ether of clear solubility will be obtained. However, if too great a quantity of water is added, the resulting hydroxy-lower-alkyl ethers of the galactomannans, in particular, at a high degree of oxyalkylation, swell considerably and thus render the work of isolating the desired product difficult to a considerable degree.

The organic solvents mentioned are used in an amount sufficient for the preparation of dispersions capable of being agitated or pumped. As a rule, for this purpose a weight ratio or organic solvents to galactomannans of from about 1.5:1 to 3:1 is sufficient. Of course, it is also possible to work with greater dilutions, even in a ratio of 10:1. However, for economical reasons, the ratio of dilution will be chosen as low as possible, both for ease of recovery of the desired product and to keep undesirable side reactions as low as possible.

To these admixtures or suspensions, the lower alkylene oxide is added either in gaseous or in liquid form. In some cases it is advantageous to place the lower alkylene oxide dissolved in a solvent in the reaction vessel.

Among the lower alkylene oxides are, for example, ethylene oxide, propylene oxide, glycide, butene oxide and butadiene monoxide.

The amount of the lower alkylene oxide utilized will vary with the desired substitution degree of the reaction product. For the preparation of ethers which are clearly soluble in cold water, a ratio of about 0.5 to 1, preferably about 0.6 to 0.8 part of lower alkylene oxide to 1 part of anhydrous galactomannan, all by weight, is desirable.

As alkaline catalysts for the process of the invention, the primary, secondary and tertiary organic amines and/or quaternary organic ammonium hydroxides are suitable. They may contain aliphatic groups, which may be interrupted by hetero atoms and/or cycloaliphatic or aromatic groups. It is further possible, that the amino group can be a constituent of a heterocyclic ring system. As catalysts, for example, the following aliphatic amines and aliphatic quaternary ammonium hydroxides are suitable: methylamine, dimethylamine, trimethylamine, tetramethyl ammonium hydroxide, ethylamine, dimethylamine, triethylamine, tetraethyl ammonium hydroxide, isopropylamine, diisopropylamine, butylamine, dibutylamine, tributyamine, tetrabutyl ammonium hydroxide, isobutylamine, diisobutylamine, the isomeric hexyl- heptyl- octyl-, nonyl-, decyl-, and dodecylamines as well as their quaternary ammonium hydroxides formed by thorough methylation Furthermore, the following aromatic amines, cycloaliphatic amines and heterocyclic amines are suitable: aniline, dimethylaniline, cyclohexylamine, piperidine, N-methylpiperidine, N-dimethylpiperidine ammonium hydroxide, pyridine, ethyl pyridine, dicyclohexylamine, pyrrolidone, benzylamine and dimethylbenzylamine. As representations of aliphatic amines, containing other functional groups in the molecule, the following, for example, may be mentioned: ethanolamine, diethanolamine, triethanolamine, propanolamine, dipropanolamine and tripropanolamine. It is also possible to use those aliphatic amines which contain more than one amino group in the molecule, as for example, ethylenediamine, propylenediamine, diethylene triamine and others. Of organic amines or quaternary organic ammonium hydroxides mentioned above about 0.5 to 20%, preferably 3 to 10%, based on theweight of galactomannan, are utilized. The necessary amount of alkaline agent is determined as a rule according to the basicity and the molecular weight of the catalyst. Among other things, the reaction velocity of the etherification reaction is dependent on the amount of the alkaline agent catalyst. Generally, by increasing the amount of organic amine or of the quaternary organic ammonium hydroxide the reaction velocity is accelerated. But it should be taken into consideration that the named catalysts themselves are apt to react with lower alkylene oxides. Therefore, if too great an amount of catalyst is used, correspondingly more lower alkylene oxide will be lost in secondary reactions and consequently will no longer be at disposal for the principal etherification reaction.

The process according to the invention occurs at temperatures of from about room temperature to about 100° C., but preferably it is conducted at temperatures of about 30° C. to 80° C., more preferably at 50° C. to 60° C. Below 30° C., the reaction velocity is already too low for the practical performance. At higher temperatures, about above 80° C., the by-reactions increase to a considerable degree leading to discoloration of the reaction product.

The reaction according to the invention may be conducted in customary open or closed vessels equipped with stirrers in batch operation or continuously. In the latter case the reaction mixture may, for example, be passed through heated tubes.

At a temperature of about 50 to 60° C. the reaction time amounts to about 2 to 4 hours; at higher temperature the reaction is correspondingly faster.

The isolation of the reaction product is simple, as the hydroxy-lower-alkyl ethers of the galactomannans produced are insoluble in the reaction media and usually appear in finely distributed form. The product is separated in suitable manner from the solvent by filtering, centrifuging or pressing out. A large portion of the catalyst and of by-products occuring from the reaction are eliminated with the separated solvent.

As a rule it is necessary to further purify the raw product obtained after solvent separation by washing it with a solvent. In accordance with an embodiment preferred for batch operation, the raw product is stirred in an adequate amount of the same solvent used for the reaction or, advantageously, of a somewhat more anhydrous solvent mixture. Then the solvent mixture of the raw product is neutralized with an acid, preferably an organic acid to avoid increasing the ash content, filtered or centrifuged to remove the solvent and then washed with a little of the same solvent.

Of course, the raw product may also be washed with an organic solvent until the wash liquors give a neutral reaction. The amount of solvent required for this method is usually larger than for the purification process described in the preceding paragraph which includes the step of neutralization of basic ingredients. The purified hydroxy-lower-alkyl ethers of the galactomannans may then be dried, preferably under vacuum.

The hydroxy-lower-alkyl ethers of the natural galactomannans produced by the process of the invention are obtained in very pure form. The ash content, calculated as sulfate ash, as in most cases less than 1%. These ethers are readily soluble in water.

The pure hydroxy-lower-alkyl ethers of galactomannans produced by the process of the invention may be utilized in most cases where stable hydrocolloids are desired. For example, they may be used as water-soluble binding agents, as thickening agents, for example, for textile or other printing dyes and as assistants for sedimentation, filtration and flotation.

The pure hydroxy-lower-alkyl ethers of galactomannans prepared by the process of the invention are most advantageously useful in the preparation of thickened aqueous solutions which must be kept as free as possible from foreign ions.

The following specific embodiments are illustrative of the invention. Obviously, however, other expedients may be employed as would occur to those skilled in the art.

The viscosities given in the examples were measured each time from 2% aqueous solution by a Brookfield viscosimeter at 20 revolutions per minute with a No. 7 spindle.

*Example I*

57 gm. of commercial pure guar flour (moisture content=12.3%) were dispersed in a solution of 5 gm. of dimethylaniline in 100 gm. of 70% aqueous isopropanol under vigorous stirring. The dispersion obtained was reacted with 30 gm. of propylene oxide in an autoclaved equipped with a stirrer with heating of the reaction mixture to 60° C. under constant stirring for 3 hours.

After the reaction mixture had cooled, the hydroxypropyl ether obtained was filtered off. The raw product was stirred in 100 gm. of 90% aqueous ispropanol and neutralized with acetic acid. After a second filtration, the product was washed with 50 gm. of isopropanol. The product thus purified was dried in a vacuum-drying chamber at a temperature of 70° C.

68 gm. of a somewhat yellowish powder were obtained which, when dissolved in water, gave a clear solution. The viscosity of a 2% solution was 1100 cp. The ash content (sulfate ash) of the dried product amounted to 0.7%.

*Example II*

57 gm. of commercial pure guar flour (moisture content=12.3%) were dispersed in a solution of 3 gm. of triethylamine in 100 gm. of 80% aqueous acetone under vigorous stirring. The dispersion thus formed was reacted in an autoclave with 30 gm. of ethylene oxide by heating to 60° C. under continuous stirring for 3 hours.

After the reaction mixture was cooled, the obtained hydroxyethyl ether was filtered off, washed first with 100 gm. of 90% aqueous acetone, then twice, each time with 50 gm. of pure acetone, and finally dried in a vacuum-drying chamber at a temperature of 70° C.

Thus 72 gm. of a somewhat yellowish powder were obtained, whose 2% aqueous solution was clear and had a viscosity of 1000 cp. The sulfate-ash content of the dry product was 0.5%.

Example III 57. gm. of commercial pure guar flour (moisture content=12.3%) were dispersed in a mixture of 80 gm. of isopropanol and 25 gm. of a 20% aqueous solution of tetraethyl ammonium hydroxide. This dispersion was reacted in an autoclave with 30 gm. of ethylene oxide by heating to 60° C. for 3½ hours under constant stirring.

After the reaction mixture was cooled, it was filtered. The hydroxyethyl ether was stirred in 100 gm. of 90% aqueous isopronol, neutralized with acetic acid to the phenolphthalein end point, filtered and washed with 50 gm. of isopropanol. The product was finally dried at a temperature of 70° C. in a vacuum-drying chamber.

67 gm. of a light yellow powder (which a sulfate-ash content of 0.9%) were obtained which dissolved in water with a clear solution. A 2% solution had a viscosity of 1150 cp.

Example IV 55 gm. of locust bean flour (with a water content of 10.1%) were stirred in a solution of 5 gm. of monoethanolamine in 150 gm. of 80% aqueous isopropanol. The dispersion thus obtained was reacted in an autoclave with 40 gm. of ethylene oxide by stirring for 3 hours at a temperature of 60° C.

After being cooled, the hydroxyethyl ether formed was filtered off. For purposes of purification it was stirred in 100 gm. of 90% aqueous isopropanol and, after being filtered, was washed with 50 gm. of pure isopropanol. Next the product thus purified was dried in a vacuum-drying chamber at a temperature of 70° C.

73 gm. of a nearly colorless powder (with a sulfate-ash content of 1.1%) were obtained. A 2% aqueous solution of the product was clear and had a viscosity of 9500 cp.

The preceding specific embodiments are illustrative of the invention. It is to be understood, however, that other expedients may be practiced without departing from the spirit of the invention or the scope of the appended claims.

We claim:

1. A process for the production of a cold-water-soluble, low-ash-content hydroxy-lower-alkyl ether of galactomannan which comprises the steps of suspending part of galactomannan in from about 1.5 to about 10 parts of a water-miscible organic solvent containing from about 20% to about 30% of water, said organic solvent being substantially inert with reference to lower alkylene oxides under the reaction conditions, reacting said suspension with from about 0.5 to 1 part of a lower alkylene oxide at a temperature of from about 30° C. to about 80° C. in the presence of from about 0.5% to 20% by weight based on said galactomannan of an alkaline agent selected from the group consisting of organic amines and quaternary organic ammonium hydroxide, separating the resultant hydroxy-lower-alkyl ether of galactomannan from the reaction mixture and recovering said hydroxy-lower-alkyl ether of galactomannan.

2. The process of claim 1 wherein said galactomannan is selected from the group consisting of guar flour and locust bean flour (carubin).

3. The process of claim 1 wherein from about 3% to about 10% by weight based on said galactomannan of said alkaline agent are utilized.

4. The process of claim 1 wherein the lower alkylene oxide is selected from the group consisting of ethylene oxide, propylene oxide, glycide, butene oxide and butadiene monooxide.

5. The process of claim 1 wherein from about 1.5 to about 3 parts of said solvent are utilized.

6. The process of claim 1 wherein said reaction is conducted at a temperature of from about 50° C. to about 60° C.

7. The product produced by claim 1.

References Cited

UNITED STATES PATENTS

| | | | |
|---|---|---|---|
| 2,845,417 | 7/1958 | Kesler et al. | 260—233.3 |
| 2,996,498 | 8/1961 | Jarowenko | 260—233.3 |
| 3,190,927 | 6/1965 | Patton et al. | 260—209 |
| 3,222,357 | 12/1965 | Wismer et al. | 260—209 |
| 3,223,699 | 12/1965 | Schlageter | 260—209 |

LEWIS GOTTS, *Primary Examiner.*

JOHNNIE R. BROWN, *Assistant Examiner.*